UNITED STATES PATENT OFFICE.

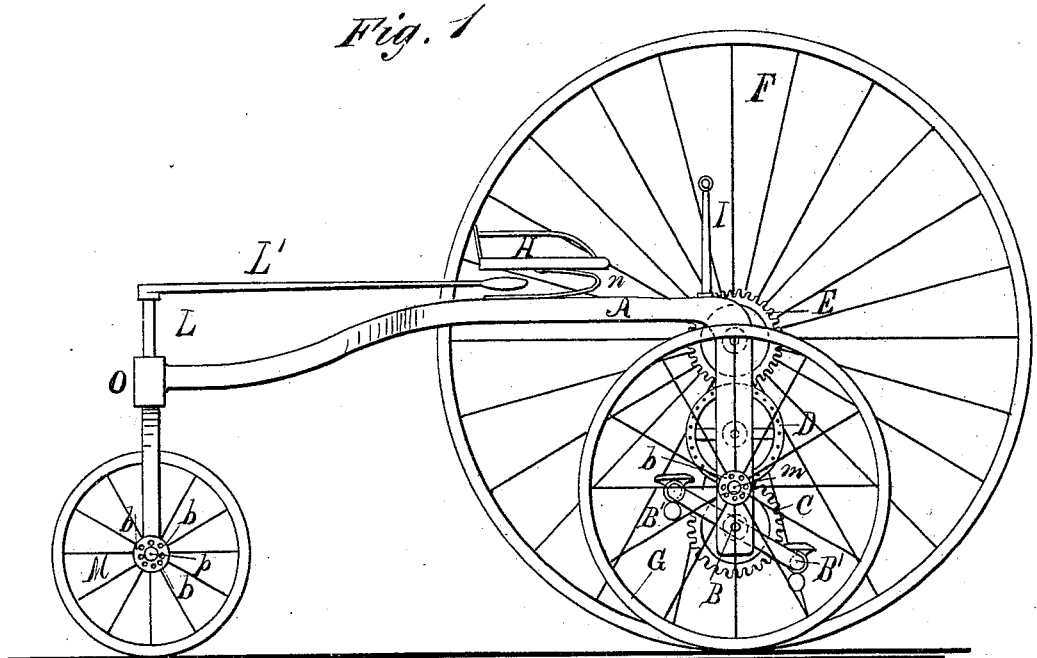

ALFRED J. HARRISON, OF PARKVILLE, CONNECTICUT, ASSIGNOR TO HIMSELF, FREDERICK LOWE, AND ALEXANDER HECTOR BERKMIRE, ALL OF SAME PLACE.

VELOCIPEDE.

SPECIFICATION forming part of Letters Patent No. 242,310, dated May 31, 1881.

Application filed December 13, 1880. (No model.)

*To all whom it may concern:*

Be it known that I, ALFRED J. HARRISON, of Parkville, in the county of Hartford and State of Connecticut, have invented a new and Improved Tricycle, of which the following is a full, clear, and exact description.

The object of this invention is to reduce the friction in the running-gear of a tricycle.

The invention consists in constructing one or two of the three driving gear-wheels of a tricycle with revolving teeth, that the fixed toothed wheel or wheels geared with them may move with less friction.

Figure 1 is a side elevation of the improved tricycle. Fig. 2 is a front elevation of the same. Fig. 3 is an enlarged side elevation of the three driving gear-wheels. Fig. 4 is an enlarged vertical elevation of the same on line $x \, x$, Fig. 3, showing also their connection with the frame, crank, and driving-wheel.

Similar letters of reference indicate corresponding parts.

In the drawings, A represents the frame, in the ends of whose vertical sides the ends of the foot-crank B are journaled in suitable boxes, $a$, that are provided with steel balls $b$, to reduce the friction of said crank ends.

Treadles B' are secured, in the usual manner, to the crank B.

On an end of the crank B that extends through the frame A is keyed a gear-wheel, C, having fixed teeth and gearing into a wheel, D, that is journaled on a fixed spindle or shaft, $c$, which extends laterally from about the center of the side of the frame A. The hub of said wheel D is provided with steel balls $b$ to reduce its friction on the spindle $c$. The rim of this wheel D is doubly flanged, and through the flanges $d$ are passed metal pins $f$, having loose tubes or spools $g$ around them, said pins and spools $f \, g$ constituting the revolving teeth of said wheel D. Said spools $g$, on contact with the fixed teeth of the other gear-wheels, C E, revolve around the pins $f$, and thereby reduce the friction of the driving-gear to a minimum.

A fixed toothed gear-wheel, E, is journaled, with its teeth gearing with the wheel D, on a spindle or shaft, $h$, that projects laterally from the frame A, and the hub $l$ of this wheel E extends outward, and serves, also, as the hub of the large tricycle driving-wheel F, and within said hub $l$, around the spindle or shaft $h$, are placed three sets of steel balls, $b$, to reduce friction. A spindle, $m$, is fixed in the opposite side of the frame A, near the lower end thereof, and, projecting laterally outward therefrom, carries the smaller supporting-wheel G, the hub of which wheel G also contains balls $b$, as indicated, that are set around the spindle $m$ to reduce friction.

Projecting upward from the frame A, on either side of the seat H, which is supported by springs $n$ on the body of the frame A, are handled supports I, by means of which the operator can steady himself in his seat, said supports I affording the operator a firm hold when he is operating the treadles B'.

The rearward extension of the frame A has a vertical socket, $o$, in its extremity, in which is held the vertical post L, in whose forked lower end is fixed a transverse spindle, $p$, on which the steering or guiding wheel M is journaled, the hub of said wheel M also containing balls $b$, as indicated in the drawings, that surround the spindle and serve to reduce friction.

On the top of the post L is secured a rod, L', that extends forward to within reach of the operator, whereby he can turn the wheel M in any desired direction, and thus control the direction of the tricycle.

I do not confine myself to the precise construction herein shown and described, as in some instances I may construct a driving-gear of one fixed toothed wheel. The central wheel, and two revolving tooth-wheels, and other modifications may be made without departing from my invention, the design of which is to construct a tricycle that will operate with a minimum of friction.

Having thus described my invention, I claim as new and desire to secure by Letters Patent—

In a tricycle, the combination, with the gear-wheels C E, of the wheel D, arranged to be revolved by and between them, and having the flanges $d \, d$, the pins $f$, and the spools $g$ on the rim, as shown and described.

ALFRED JOHN HARRISON.

Witnesses:
ARTHUR F. EGGLESTON,
JOHN R. BUCK.